June 12, 1956     J. H. WRIGHT     2,749,746
MAGNETOSTRICTION STRAIN GAUGE
Filed July 14, 1953
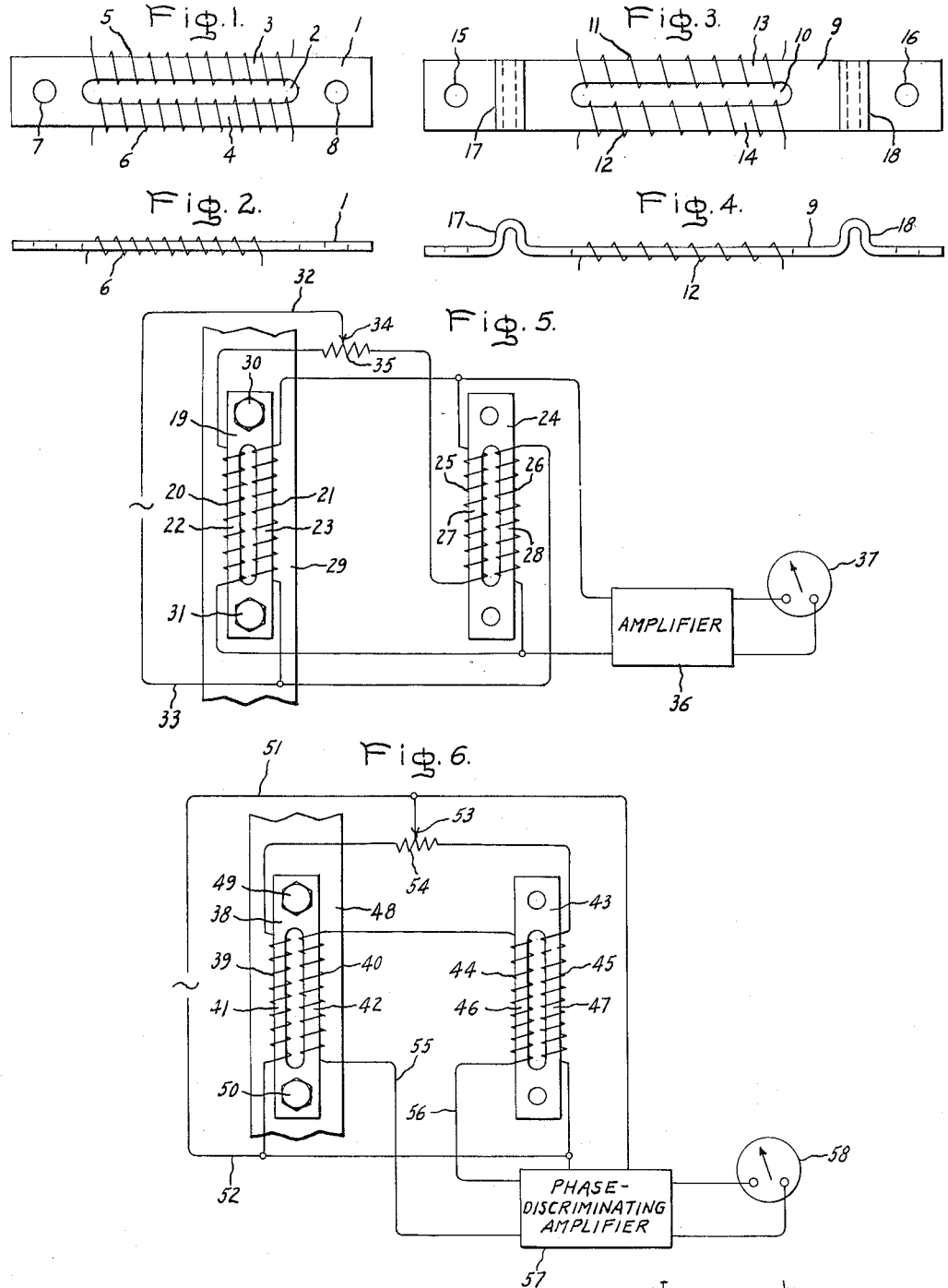
Inventor:
James H. Wright,
by John W. Ralls
His Attorney.

United States Patent Office 2,749,746
Patented June 12, 1956

2,749,746

MAGNETOSTRICTION STRAIN GAUGE

James H. Wright, Lynnfield, Mass., assignor to General Electric Company, a corporation of New York Application July 14, 1953, Serial No. 367,959

1 Claim. (Cl. 73—88.5)

My invention relates to improved strain gauges using magnetostriction effects.

It is known that the permeability of magnetostrictive materials varies as a function of the strain of the material. An electrical winding on a magnetic core of magnetostrictive material thus has an inductance which varies as a function of the strain of the core. One or more such windings may be connected in an electrical bridge circuit to measure strain produced on one or more of the magnetic cores. Such magnetostriction gauges have previously been used to measure mechanical forces, by applying the force directly to the magnetostrictive core to produce strain therein. Such gauges have not been suitable for use as strain gauges which may be attached to other structures for measuring the strain in such structures.

A principal object of my invention is to provide an improved magnetostriction strain gauge which is more compact and better suited for a variety of applications than gauges of this type heretofore available, and which may conveniently be attached to another member in which strain is to be measured so that strain of such other member produces a proportional strain of the magnetostrictive core of the gauge. Other objects and advantages will appear as the description proceeds.

Briefly stated, in accordance with one aspect of my invention, I provide a flat unitary magnetic core for a magnetostriction strain gauge by cutting a lengthwise slit in the center portion of a generally flat thin strip of magnetostrictive material, thus forming two parallel legs on which electrical windings are placed. Since the gauge so constructed is flat and compact, it can be attached easily to a great variety of structures for strain measurements, where previous magnetostriction gauges could not be used conveniently because of their bulk or shape. Since the transverse cross-sectional area of the thin strip is small, relatively small forces are required to produce appreciable strain in the magnetostrictive core, and consequently attachment of the gauge to a structural member subject to strain has little effect on the magnitude of the strain to be measured. The unitary core construction provides increased ruggedness and reliability, and lends itself to economical manufacture.

My invention will be better understood from the following description taken in connection with the accompanying drawing, and its scope will be pointed out in the appended claim. In the drawing, Fig. 1 is a schematic plan view of a strain gauge embodying principles of my invention, Fig. 2 is a side elevation of the gauge shown in Fig. 1, Fig. 3 is a schematic plan view of another improved strain gauge embodying the principles of my invention, Fig. 4 is a side elevation of the gauge shown in Fig. 3, Fig. 5 is a circuit diagram of strain measuring apparatus embodying principles of my invention, and Fig. 6 is a circuit diagram of other strain measuring apparatus embodying principles of my invention.

Referring to Figs. 1 and 2, an improved strain gauge comprises a flat, substantially rectangular, elongated strip 1 of magnetostrictive material such as nicaloi. The center portion of strip 1 as a lengthwise slit 2, as shown, the ends of which are preferably rounded to prevent localized stress concentrations. This strip with its central slit forms a unitary magnetic core having two parallel legs 3 and 4 connected together by the end portions of strip 1 which serve as yokes to provide a closed magnetic path through legs 3 and 4. On the respective legs 3 and 4 there are two electrical windings 5 and 6, as shown. Mounting holes 7 and 8 may be provided in the respective end portions of strip 1 to facilitate attachment of the strain gauge to a member in which strain is to be measured. When strip 1 is placed under lengthwise tension or compression, selectively, the permeability of the core increases or decreases. These changes in permeability produce corresponding changes in the respective inductance values of windings 5 and 6, and in the mutual inductance between the two windings. Either the inductance changes or the mutual inductance changes may be used in suitable strain measuring apparatus, as hereinafter more fully described, in making the desired strain measurements.

In applications where relatively large strains may be encountered, the gauge shown in Figs. 1 and 2 would be damaged by any strain great enough to exceed the elastic limit of the magnetostrictive strip 1. For measuring such relatively large strain values, a gauge of the type shown in Figs. 3 and 4 may be used, which is generally similar to the gauge shown in Figs. 1 and 2 except that resilient portions are provided which take up part of the strain.

The strain gauge shown in Figs. 3 and 4 comprises a generally flat strip 9 of magnetostrictive material having a lengthwise slit 10 in the central portion thereof. Electrical windings 11 and 12 are provided on the two parallel legs 13 and 14, respectively, of the magnetic core. Mounting holes may be provided at 15 and 16. To permit greater lengthwise strain of strip 9 without exceeding the elastic limit of the magnetostrictive material, each end portion of the strip has an upwardly bent transverse resilient channel, as shown at 17 and 18. When strip 9 is stretched lengthwise, channels 17 and 18 tend to straighten, thus taking up part of the strain. Conversely, when strip 9 is compressed lengthwise, channels 17 and 18 tend to bend to a greater degree, thereby taking up part of the compressional strain. Otherwise, this strain gauge operates in the same manner as the gauge shown in Figs. 1 and 2.

The improved strain gauges may be used in many different electrical circuits, as will be appreciated by those skilled in the art. A preferred impedance bridge circuit is shown in Fig. 5. Two similar strain gauge elements are provided, the first of which comprises a magnetostrictive strip 19 having electrical windings 20 and 21 on the two legs 22 and 23 respectively. The second gauge comprises a similar strip 24 having windings 25 and 26 on the two legs 27 and 28 respectively. Preferably the two gauges have similar electrical characteristics, although, if desired, strip 24 may be of a material which is not magnetostrictive.

A member in which strain is to be measured is schematically represented at 29. Strip 19 is attached to member 29, by bolts 30 and 31, for example, so that a strain of member 29 applies a lengthwise strain to strip 19. Preferably, the cross-sectional area of strip 19 is much smaller than that of member 29, so that attachment of the gauge has a negligible effect on the magnitude of the strain to be measured. The other gauge, strip 24, is a comparison or balancing element, preferably not subject to strain. The windings 20, 21, 25 and 26 are connected together as shown, as the four arms of an impedance bridge. This bridge is energized by alternating current supplied from any suitable source through connections 32 and 33. The bridge may be balanced initially by adjusting the tap 34 along a resistor 35 connected between windings 20 and 25 as shown. The degree of electrical unbalance of the bridge is measured by any suitable means, such as the amplifier 36 and electrical instrument 37.

In one mode of operation, tap 34 may be adjusted so that the bridge is substantially balanced when strip 19 is not strained. Under these conditions, instrument 37 will indicate 0, or some small minimum value. When strip 19 is strained by extension or compression of member 29, the bridge is unbalanced and the indication of instrument 37 increases as a function of the amount of strain. This arrangement, which is quite sensitive and most suitable for many applications, has the disadvantage in other applications that either extension or compression of member 29 produces an up-scale indication of instrument 37, with no means for distinguishing between the two directions of strain.

According to another mode of operation, tap 34 is adjusted to produce some arbitrary up-scale indication of instrument 37, mid-scale for example, when strip 19 is not strained. Tension of member 29 can then be distinguished from compression of member 29, since one direction of strain increases the bridge unbalance, and thus increases the indication of instrument 37, while the other direction of strain decreases the bridge unbalance, and thus provides a down-scale indication of instrument 37.

Fig. 6 shows a mutual inductance bridge circuit employing the improved strain gauges. A first strain gauge comprises a magnetostrictive strip 38 having electrical windings 39 and 40 on the two legs 41 and 42 respectively. A second gauge comprises a strip 43 having windings 44 and 45 on the two legs 46 and 47 respectively. Strip 38 is attached to a member 48, by bolts 49 and 50, for example, so that any extension or compression of member 48 provides lengthwise strain of strip 38. The second gauge, strip 43, is a comparison or balancing element, preferably not subject to strain.

Windings 39 and 45 are energized with alternating current from any suitable source through connections 51 and 52, and act as transformer primary windings. The windings 40 and 44 act as transformer secondary windings, and are connected together in series bucking relation. The adjustable tap 53 of resistor 54, connected between windings 39 and 45 as shown, is preferably adjusted so that, when strip 38 is not strained, the voltage induced in winding 40 exactly equals and opposes the voltage induced in winding 44, and the net voltage across connections 55 and 56 is 0.

When strip 38 is strained, the mutual inductance between windings 39 and 40 changes, and a net voltage appears between connections 55 and 56. The phase of the voltage between connections 55 and 56 depends upon the direction of bridge unbalance; that is, this voltage has one phase relation with respect to the energizing voltage when member 48 is stretched, and has a phase relation 180° different when member 48 is compressed. Unbalance of the bridge is preferably measured by a phase discriminating amplifier 57, which may be any of several well-known types and which provides to electrical instrument 58 a direct current which reverses in polarity in correspondence with phase reversals of the voltage between connections 55 and 56. Consequently, unbalance of the bridge in one direction, for example upon extension of member 48, produces a positive indication at instrument 58, while unbalance in the other direction, for example upon compression of member 48, produces a negative indication at instrument 58.

It will be understood that my invention is not limited to the specific embodiments herein illustrated and described, and that the following claim is intended to cover all changes and modifications which do not depart from the true spirit and scope of the invention.

What I claim as new and desire to secure by Letters Patent of the United States is:

Apparatus for measuring tension and compression forces in a deformable member, comprising a thin and substantially rectangular strip of magnetostrictive material having a lengthwise slit in the center portion thereof which divides said strip into two parallel core leg portions connected together by end portions of said strip, means for mounting said end portions of said strip on said deformable member at spaced-apart positions on said member, said strip having thickness and width yielding a cross-sectional area substantially smaller than that of said deformable member whereby mounting of said strip has relatively little effect upon forces in said member, at least one of said end portions of said strip having at least one resilient transverse upwardly bent channel to prevent elastic limits of said magnetostrictive material from being exceeded by deformation of said member, electrical winding means surrounding at least one of said core leg portions of said strip, and means responsive to the inductive characteristics of said winding means and strip for measuring said tension and compression forces.

References Cited in the file of this patent
UNITED STATES PATENTS

| | | |
|---|---|---|
| 1,666,680 | Buckley | Apr. 17, 1928 |
| 1,906,551 | De Forest | May 2, 1933 |
| 2,376,156 | Kuehni | May 15, 1945 |
| 2,460,076 | Emerson | Jan. 25, 1949 |
| 2,461,635 | Feller | Feb. 15, 1949 |
| 2,571,718 | Howes | Oct. 16, 1951 |
| 2,605,635 | Hast | Aug. 5, 1952 |